April 26, 1932.   V. D. BARKER   1,855,876
METHOD OF AND APPARATUS FOR PRODUCING ELECTRICAL RESISTANCE ELEMENTS
Filed March 21, 1929   2 Sheets-Sheet 1
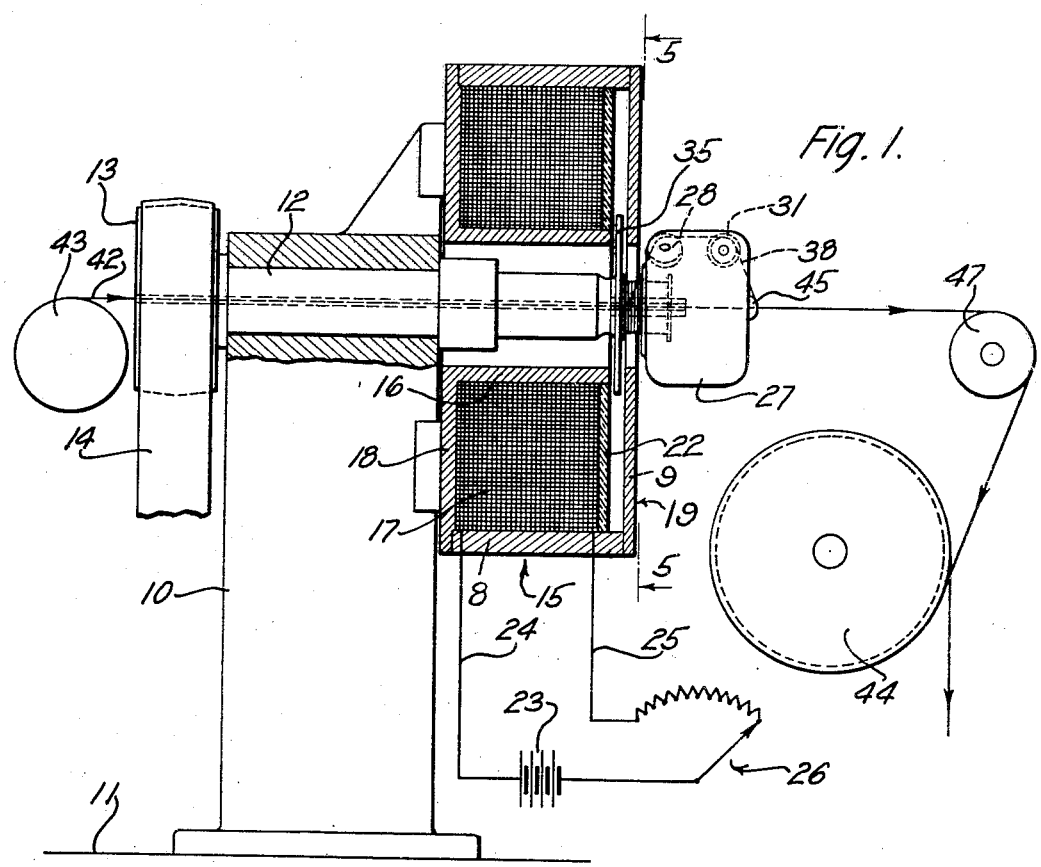
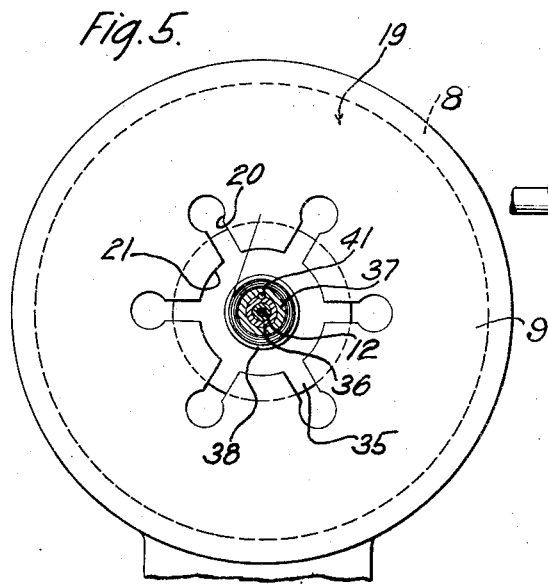
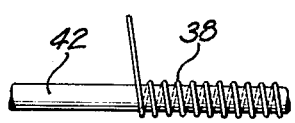
Inventor
Virgil D. Barker
By  Attt'y.

April 26, 1932.  V. D. BARKER  1,855,876
METHOD OF AND APPARATUS FOR PRODUCING ELECTRICAL RESISTANCE ELEMENTS
Filed March 21, 1929  2 Sheets-Sheet 2
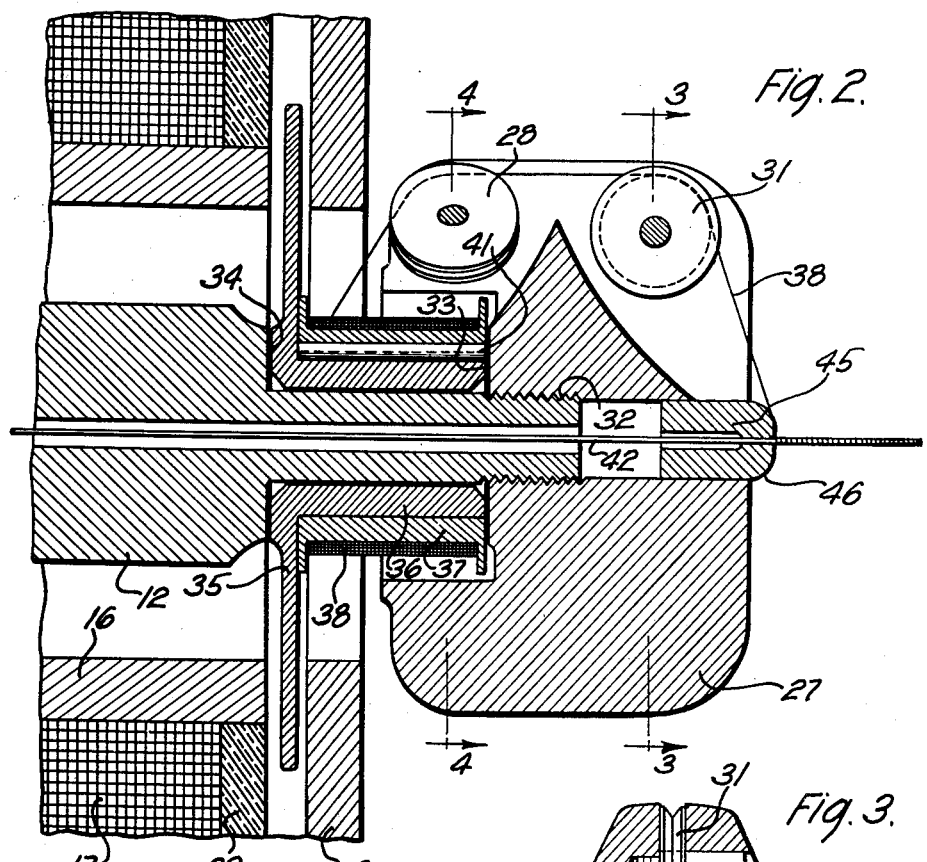
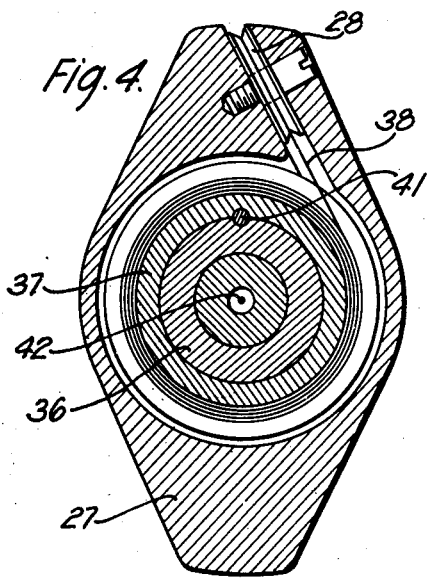
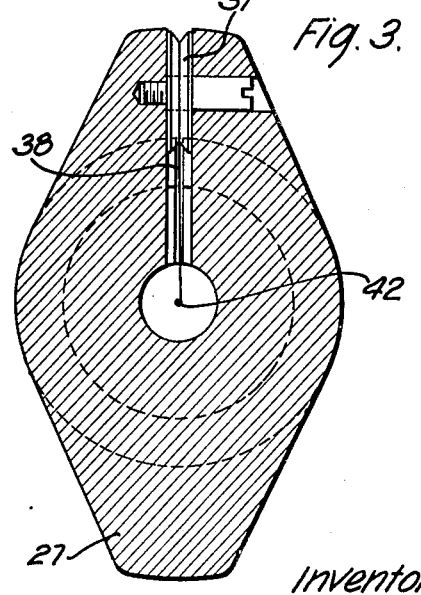
Inventor
Virgil D. Barker Patented Apr. 26, 1932

1,855,876

UNITED STATES PATENT OFFICE

VIRGIL DEWEY BARKER, OF RIVERSIDE, ILLINOIS, ASSIGNOR TO WESTERN ELECTRIC COMPANY, INCORPORATED, OF NEW YORK, N. Y., A CORPORATION OF NEW YORK

METHOD OF AND APPARATUS FOR PRODUCING ELECTRICAL RESISTANCE ELEMENTS

Application filed March 21, 1929. Serial No. 348,691.

This invention relates to a method of and apparatus for producing electrical resistance elements, and more particularly to a method of and apparatus for producing filaments for incandescent lamps.

In the production of filaments for incandescent lamps, a fine tungsten wire or other material in some instances is coiled under tension on a mandrel, and in order to produce a uniform product the tension in the tungsten wire must be very accurately controlled.

Objects of the invention are the provision of a method of and apparatus for accurately controlling the tension in traveling material.

In accordance with one embodiment of the invention as applied to a machine for coiling fine trungsten wire on a mandrel, a spool containing a supply of tungsten wire is rotatably mounted on a winding machine, a disk of metal, preferably phosphor bronze, being secured to the spool, and an electromagnet is positioned with its pole pieces adjacent opposite surfaces of the disk to produce an electromagnetic braking action across the disk and to maintain a constant tension in the filament. The strength of the braking action may be controlled by means of a rheostat connected in the current supply line to the electromagnet.

Other features and advantages of the invention will become apparent from the following detailed description of one embodiment thereof, reference being had to the accompanying drawings, wherein Fig. 1 is a side elevational view, partly in section, of a device embodying the features of the invention;

Fig. 2 is an enlarged fragmentary sectional view of the structure shown in Fig. 1;

Figs. 3 and 4 are sectional views taken on the lines 3—3 and 4—4 respectively of Fig. 2 in the direction of the arrows;

Fig. 5 is a fragmentary sectional view taken on the line 5—5 of Fig. 1 in the direction of the arrows; and Fig. 6 is an enlarged view of a portion of the mandrel having filament wound on a part thereof.

Referring now to the drawings wherein like reference characters designate the same parts throughout the several views, the numeral 10 designates a standard mounted on a support 11 and having rotatably journaled in the upper end thereof a hollow spindle 12. A pulley 13 mounted on the left end (Fig. 1) of the spindle 12 may be driven by a belt 14 connected to and driven by a motor (not shown).

Mounted at the right side (Figs. 1 and 2) of the standard 10 is a stationary electromagnet designated generally by the numeral 15 and composed of a hollow cylindrical member 16 about which the windings 17 of the electromagnet are wound. A retaining member 18 is formed integral with the member 16 and serves to retain the windings in place thereon. The member 16 in addition to serving as a core about which the windings of the electromagnet may be wound acts as one of the pole pieces of the magnet. Secured to the member 18 is an annular member 8 which cooperates with a plate 9 to form a cup-shaped member 19 which with the member 18 serves as a casing for the windings of the electromagnet 15 and also acts as the other pole piece of the magnet. The cup-shaped member 19 is thus composed of two separate parts attached together as shown in Fig. 1, the annular portion 8 extending in a horizontal plane and the plate 9 forming the base of the cup-shaped member and extending in a vertical plane. The plate 9 of the member 19 is cut away to form radial slots 20 (Fig. 5) and inwardly extending projections 21 which serve as concentration points for the passage of flux from the pole piece 19 to the pole piece 16. A head 22 is secured to the annular member 16 and the member 19 to retain the windings of the electromagnet in place about the member 16 by forcing it into place, the head being formed to such a size as to be held in place by friction. The windings of the electromagnet 15 are connected to a source of electrical energy 23 by conductors 24 and 25, and a rheostat 26 is interposed in the conductor 25 for controlling the amount of energy supplied to the electromagnet.

A coiling head 27 having pulleys 28 and 31 mounted therein is threaded on the right end (Figs. 1 and 2) of the spindle 12 at 32. Rotatably mounted on the spindle 12 between a shoulder 33 formed by a depression in the coiling head and a shoulder 34 formed on the spindle, is a disk 35, preferably made of phosphor bronze, and having a laterally extending hub 36 formed thereon. A spool 37 containing a supply of fine tungsten wire 38 is fixed to the hub 36 by means of a key 41.

The tungsten wire 38 is wound about a mandrel 42 which is drawn from a supply spool 43 through the hollow spindle 12 by a capstan 44 which is driven by a suitable gearing (not shown) connected to the spindle 12. The means for driving the capstan will not be described in detail since it does not form a part of this invention.

A die 45 is secured in the coiling head 27 for guiding the mandrel and has a rounded forward portion 46 adapted to engage the fine tungsten wire during its passage to the mandrel. A guide pulley 47 is positioned between the die 45 and the capstan for guiding the mandrel from the coiling head to the capstan. After passing over the capstan the mandrel with the tungsten wire wound thereon is directed to mechanism (not shown) wherein it is cut into predetermined lengths for use in incandescent lamps.

It is believed that the invention will be fully understood by referring to the following description of the operation thereof. A spool 37 containing a supply of fine tungsten wire is secured on the hub 36 of the disk 35 and a portion of wire is unwound from the spool. The mandrel 42 is then passed through the hollow spindle 12, the coiling head 27, and the die 45 over the guide pulley 47 and wound several times around the capstan 44. After the mandrel is thus secured in position the coiling head is threaded on the end of the spindle 12 and the portion of tungsten wire unwound from the spool is passed over the pulleys 28 and 31 and wound manually several times about the mandrel. The mechanism for driving the capstan and the spindle is then started and the tungsten wire is wound around the mandrel by rotating the spindle carrying the coiling head around the mandrel to draw the tungsten wire from the spool 37.

The tension in the tungsten wire is accurately regulated by controlling the strength of the magnetic field between the pole pieces 19 and 16 of the electromagnet 15 by means of the rheostat 26, since the passage of flux between the projections 21 of the pole piece 19 and the pole piece 16 will set up eddy currents in the disk 35 which react against the flux to retard the rotation of the disk. Therefore, the resistance set up to retard the rotation of the disk will be proportional to the strength of the magnetic field.

The phosphor bronze disk 35 constitutes a conductor moving in an electromagnetic field which is directed by pole pieces 16 and 19 in a direction perpendicular to the plane of the disk. According to the well-known laws of the generator, a conductor moving in a magnetic field will generate an electromagnetic force at right angles to the direction of the field and at right angles to the direction of motion, so that in this case the direction of the induced current is radially of the bronze disk 35. If the electromotive force be permitted to establish a current in a closed electrical circuit, there will be a torque reaction on the bronze disk opposite to its direction of motion.

The pole piece 19 is formed with alternate slots 20 and projections 21 in order that no electromotive force shall exist in those portions of the disk opposite the slots 20. There is set up in the disk, therefore, a series of circulating currents or eddy currents, which for example may be directed radially outward opposite the projections 21 and radially inward opposite the slots 20. These eddy currents are dissipated in the heating of the bronze disk, and they exert a drag or braking effect on the disk similar to that exerted by the field upon the rotating armature of a generator, which produces the desired tension.

This invention has been described with particular reference to the coiling of tungsten filament for lamps, but it is capable of many other uses and should be limited only by the scope of the appended claims.

What is claimed is:

1. A method of applying material on a member which consists in rotatably mounting a wound supply of material surrounding the member, attaching the free end of said supply to the member, rotating the portion of material between the supply and the attached end to thereby rotate the supply and wind the material onto the member, and maintaining a magnetic braking connection between the supply and a fixed member.

2. A method of controlling the tension in strand material being wound upon a mandrel from a rotatably mounted supply thereof, which consists in rotating the supply about the mandrel, establishing an electromagnetic field adjacent the rotating supply to set up eddy currents for retarding the rotation of the supply, and controlling the strength of the electromagnetic field to regulate the tension in the strand material.

3. In combination with a material winding device including a mandrel, means for advancing the mandrel, a spool containing a supply of material, means for rotating the spool around the mandrel to wind the material on the mandrel, a tension controlling device comprising a disk attached to the spool, an electromagnet having its pole pieces adjacent opposite sides of the disk for establishing a magnetic field in the path of the disk to offer resistance to its rotation, and means for controlling the strength of the magnetic field to control the resistance to rotation of the disk.

4. A device for controlling the tension in travelling material comprising a rotatable member containing a supply of material, means for drawing the material from the rotatable member, an electromagnet, a disk rotatable with said rotatable member in the field of said electromagnet, and means for controlling the strength of the electromagnetic field established by said electromagnet to control the resistance offered thereby to the rotation of the disk.

5. A device for controlling the tension in travelling material comprising a rotatable member for containing a supply of material, means for drawing the material from the rotatable member, a disk of substantially non-magnetic material secured to said rotatable member, means for establishing an electromagnetic field in the path of rotation of the disk to offer resistance to said rotation, and means for controlling the strength of the magnetic field.

6. In a device for coiling a wire on a mandrel, means for advancing the mandrel, a spool surrounding the mandrel and containing a supply of wire, a head rotatable about the mandrel to unwind wire from the spool and to wind it around the mandrel, a disk secured to the spool, an electromagnet positioned with its poles adjacent opposite sides of the disk for establishing an electromagnetic field across the disk to effect a braking connection between the electromagnet and the disk, and means for controlling the strength of the electromagnetic field.

7. A material winding device including a mandrel, a supply of material to be wound, means for rotating the material around the mandrel to rotate the supply and wind the material on the mandrel, and means for maintaining a magnetic braking connection between the winding device and the rotating supply.

8. In a material winding device, a mandrel, means for rotatably supporting a supply of material adjacent the mandrel, means for winding the material on the mandrel and thereby rotating the supply, a fixed member, and means for maintaining a magnetic braking connection between the fixed member and the rotating supply.

9. In a material winding device, a mandrel, a supply of material to be wound on the mandrel, means for rotatably supporting the supply of material adjacent the mandrel, means for rotating the supply around the mandrel, and means for establishing an electromagnetic field adjacent the rotating supply to regulate the tension in the material.

10. A method of controlling the tension in material being wound upon a mandrel, which consists in rotatably supporting a supply of material adjacent the mandrel, and establishing an electromagnetic field adjacent the supply to set up eddy currents in a portion of the support for the supply for reaction against the flux of the electromagnetic field to retard the rotation of the supply.

11. A device for controlling the tension in a strand being drawn from a supply, comprising a disk attached to and rotatable with the supply, an electromagnet having its pole pieces on opposite sides of the disk for creating a flow of electromagnetic flux across the disk to set up eddy currents therein for reaction against the flux to retard the rotation of the disk, and means for controlling the strength of the electromagnetic flux field to control the resistance offered thereby to the rotation of the disk.

In witness whereof, I hereunto subscribe my name this 12th day of March, A. D. 1929.

VIRGIL DEWEY BARKER.